United States Patent [19]

Liang et al.

[11] Patent Number: 5,292,422
[45] Date of Patent: Mar. 8, 1994

[54] MODULES FOR ELECTRODEIONIZATION APPARATUS

[75] Inventors: Li-Shiang Liang, Berlin; Gary C. Ganzi, Lexington; Frederick Wilkins, Pepperill, all of Mass.

[73] Assignee: IP Holding Company, Wilmington, Del.

[21] Appl. No.: 945,151

[22] Filed: Sep. 15, 1992

[51] Int. Cl.$^5$ ............................................. B01D 63/00
[52] U.S. Cl. ........................................................ 204/301
[58] Field of Search ........................................... 204/301

[56] References Cited

U.S. PATENT DOCUMENTS

| | | | |
|---|---|---|---|
| 2,689,826 | 9/1954 | Kollsman | 204/301 |
| 2,708,650 | 5/1955 | Rosenberg | 204/301 |
| 2,815,320 | 12/1957 | Kollsman | 204/180 |
| 2,854,394 | 9/1958 | Kollsman | 204/180 |
| 2,923,674 | 2/1960 | Kressman | 204/180 |
| 3,014,855 | 12/1961 | Kressman | 204/180 |
| 3,149,061 | 9/1964 | Parsi | 204/180 |
| 3,216,920 | 11/1960 | Nellen | 204/301 |
| 3,223,606 | 12/1965 | Chen | 204/180 |
| 3,291,713 | 12/1966 | Parsi | 204/180 |
| 3,330,750 | 7/1967 | McRae et al. | 204/180 |
| 3,375,182 | 3/1968 | Chen | 204/180 |
| 4,032,452 | 6/1977 | Davis | 204/243 |
| 4,202,772 | 5/1980 | Goldstein | 210/232 |
| 4,632,745 | 12/1989 | Guiffrida et al. | 204/301 |
| 4,804,451 | 2/1989 | Palmer | 204/301 |
| 4,822,471 | 4/1989 | MacDonald | 204/301 |
| 4,871,431 | 10/1989 | Parsi | 204/301 |
| 4,923,611 | 5/1990 | Hanada et al. | 210/638 |
| 4,925,541 | 5/1990 | Giuffrida et al. | 204/182.5 |
| 4,931,160 | 6/1990 | Giuffrida | 204/301 |
| 4,956,071 | 9/1990 | Giuffrida et al. | 204/301 |
| 4,969,983 | 11/1990 | Parsi | 204/182.4 |
| 5,066,375 | 11/1991 | Parsi et al. | 204/182.4 |
| 5,120,416 | 6/1992 | Parsi et al. | 204/182.4 |

FOREIGN PATENT DOCUMENTS

WO89/00453 1/1989 European Pat. Off.
3808043 9/1989 Fed. Rep. of Germany.

OTHER PUBLICATIONS

"The Application of Electrodialysis to Demineralization", AIChE Symposium Series No. 9, 1965, pp. 79–83 (Gittens).
"Some Aspects of the High Frequency Conductance of Electrolytes" J. Electrochem. Soc., vol. 136, No. 10 (Ghowsi).
"Donnan Dialysis Concentration Using Cation Exchange Membrane Prepared by Paste Method", J. Chem. Eng. Japan, vol. 23, No. 6, 1990 pp. 280–685 (Sudoh).
"*Dialytic Properties of Domestic Ion-Exchange Membranes for Desalination of Saline Water by Electrodialysis*", Environmental Protection Engineering, vol. 15, No. 3–4, pp. 155–162, (1989).
Gittens, G. H., Watts, R. E., *Some Experimental Studies of Electrodeionisation Through Resin Packed Beds*, Mar., 1964, U.K.A.E.A. Research Group, pp. i–33.
Matejka, Z., *Continuous Production of High–Purity Water by Electrodeionisation*, J. Appl. Chem. Biotechnol. 1971, vol. 21 (Apr.).
Strathmann, H. and Kock, K., *Effluent Free Electrolytic Regeneration of Ion-Exchange Resins*, pp. 145–158.
Glueckauf, E., *Electro–Deionisation Through a Packed Bed*, Dec. 1959, pp. 646–651, British Chemical Engineering.

*Primary Examiner*—John Niebling
*Assistant Examiner*—Arun S. Phasge
*Attorney, Agent, or Firm*—Wolf, Greenfield & Sacks

[57] ABSTRACT

A novel electrodeionization apparatus is disclosed. The apparatus includes a plurality of disk-shaped concentrating and diluting cell pairs which provide an apparatus which minimizes losses of ion exchange membrane efficiency due to membrane sealing to compartment spacers. In addition, a novel method for filling individual cells or cell pairs with ion exchange resins is disclosed.

41 Claims, 7 Drawing Sheets

MODULES FOR ELECTRODEIONIZATION APPARATUS

FIELD OF THE INVENTION

This invention relates to novel electrodeionization apparatus adapted to transfer ions in a liquid under the influence of an electrical field.

BACKGROUND OF THE INVENTION

The purification of a liquid by reducing the concentration of ions or molecules in the liquid has been an area of substantial technological interest. Many techniques have been used to purify and isolate liquids or to obtain concentrated pools of specific ions or molecules from liquid mixtures. Known processes include electrodialysis, liquid chromotography, membrane filtration, reverse osmosis, ion exchange and electrodeionization. As used herein, the term electrodeionization refers to the process wherein an ion exchange material such as an ion exchange resin is positioned between anionic and cationic diaphragms or membranes. In contrast, the term electrodialysis relates to a process which does not utilize ion exchange materials positioned between the anionic and cationic diaphragms.

Early suggestions for treating liquids using processes that ultimately evolved to electrodeionization in the modern sense of the term were described by Kollsman in U.S. Pat. Nos. 2,689,826 and 2,815,320. The first of these patents describes an electrodialysis apparatus and process for the removal of ions from a process stream. The ions are removed from the stream as it flows through a depleting chamber defined, in part, by anion and cation permeable diaphragms. The ions pass through their respective permeable membranes and into a second volume of liquid in a concentrating chamber under the influence of an electrical potential which causes preselected ions to travel in a predetermined direction. The volume of the liquid being treated is depleted of ions while the volume of the second liquid is enriched with the transferred ions and carries them in concentrated form.

The second of these patents describes the use of macroporous beads formed of ion exchange resins as a filler material between the anionic and cationic diaphragms. The ion exchange resin acts as a path for ion transfer and also serves as an increased conductivity bridge between the membranes for movement of ions. These patents represent the primary structural framework and theory of electrodeionization as a technique.

Significantly improved electrodeionization systems have more recently been disclosed in U.S. Pat. No. 4,925,541 to Giuffrida et al. and U.S. Pat. No. 4,931,160 to Giuffrida, the teachings of which in their entireties are incorporated herein by reference.

In these references, the depleting and concentrating chambers are present as cell pairs each having a rectangular configuration that is 16.3 inches wide and 33.75 inches long. Each cell pair consists of a diluting compartment, in which contaminants are removed from a first process stream (the diluting stream), and a concentrating compartment in which the contaminant ions are concentrated in a second process stream (the concentrating stream). For reference purposes, the process stream in the diluting compartment is referred to as a dilute or diluting stream, and the process stream in the concentrating compartment is referred to as the concentrate or concentrating stream.

The diluting compartment is defined by a spacer molded from polypropylene and having dimensions the same as that of the rectangular cell configuration and a thickness of 0.090 inches. The compartment is filled with ion exchange resin, preferably in the form of beads. Electrodialysis membranes of the same rectangular dimensions as the spacer are bonded to both sides of the spacer to form the top and bottom walls of the diluting compartment. The membranes differ in that one is an anion exchange membrane, whereas the other is a cation exchange membrane. A series of thin parallel channels, each 1.08 inches wide, 25.75 inches long, and 0.090 inches deep define flow paths for the process stream which is flowed through the diluting compartment, (the diluting stream). The diluting stream is flowed into the diluting compartment and is directed into the channels through a manifold. The manifold includes numerous obstructions which are designed to prevent channeling and to evenly distribute the flow among the channels. The spacer includes a flow inlet and flow outlet located on diagonally opposite corners to equalize pressure drop across all flow paths from the inlet to the outlet.

The concentrating compartment is also defined by a spacer having the same rectangular dimensions as that of the diluting compartment. The spacer of the concentrating compartment may be thinner than that of the diluting compartment, however, as will be described shortly, in some applications the concentrating spacer is of the same thickness as the diluting spacer. In general, the concentrating compartment contains an inert screen which serves to mix the concentrating stream flowing therethrough. Alternatively, if the apparatus is to be operated in a polarity reversal mode, or in an all-filled non-polarity-reversal mode, the screen is replaced with an ion exchange resin or ion exchange resin mixture.

The ion exchange resins and membranes may be those described in the aforementioned Giuffrida patents. Alternatively, the resins and membranes may be those described in co-pending U.S. patent application Ser. No. 07/628,338, filed Dec. 17, 1990, and its co-pending continuation-in-part, U.S. patent application Ser. No. 07/841,021 filed Feb. 25, 1992, the teachings of each of which are incorporated by reference herein.

During assembly of an electrodeionization unit, the cell pairs are stacked and compressed between molded polypropylene end blocks backed by aluminum end plates. The end plates are attached to each other by tie-bars located along the periphery of the end plates. The end blocks, end plates and tie-bars are referred to as the closing mechanism.

Although the electrodeionization apparatus described above has found wide commercial application, some shortcomings of the current cell design exist. For example, the active area of the membranes on both sides of the dilute spacer is the area which acts as the boundary of each of the flow channels. Typically, the total active area for membrane is 278 square inches which is only approximately 50% of the total membrane area. The other 50% of the membrane area is unusable because it is in contact with impermeable areas of the spacer or is sealed by gaskets or adhesives. As the overall efficiency of an electrodeionization apparatus depends, in part, on the total membrane area available for ion exchange, it is clear that ion exchange performance can be enhanced by minimizing the amount of unusable membrane surface area. Flow distribution through the channels is also a concern, particularly as the flow rate through a cell pair is varied from minimal to maximal flow.

The flow capacity of an individual electrodeionization unit can be expanded only by adding cell pairs, which necessitates disassembly of the closing mechanism, insertion of cell pairs and installation of longer tie-bars.

Finally, the perimeter of the cell pairs must be sealed from the environment. This is achieved using adhesives that are typically elastomers. The current rectangular electrodeionization modules have, on occasion, been subject to leakage which is undesirable, particularly in small electrodeionization units housed inside enclosures.

Thus, a need exists for an electrodeionization apparatus which allows a greater utilization of the ion exchange membrane.

A need also exists for an electrodeionization apparatus having a simpler, and more secure means for maintaining a seal between the respective diluting and concentrating compartments.

An additional need exists for an electrodeionization apparatus having a modular design.

A further need exists for an electrodeionization apparatus that can be fabricated using a higher level of automation.

SUMMARY OF THE INVENTION

The present invention relates to an electrodeionization apparatus having novel module design. In particular, the inventive electrodeionization apparatus includes concentrating and diluting cells having a generally disk-shaped configuration. The individual cells may be either circular or polygonal, such as, for example, hexagonal. Unlike conventional rectangular electrodeionization modules in which flow is generally parallel from one end of the module to the other, the flow path of process streams passing through the concentrating and diluting cells is radial. This flow path can be lengthened by providing the modules with channeling means such as, for example, baffles which provide the process streams with a spiral or arc-like flow path.

The electrodeionization apparatus of the present invention lends itself to automated manufacturing for numerous reasons. Among these, the new module design allows the complete electrodeionization stack to be assembled prior to filling the compartments with ion exchange resins. Upon assembly of the stack, resin filling can be accomplished by pumping a suspension of resins in the form of a slurry into the stack through ports in the center of the stack while simultaneously rotating the stack about its axis. The rotational force causes the resin to be evenly distributed within the compartments to be filled. The modules include either a slotted periphery or a flow channel through which the process stream will enter each module. As a result of these structures, during filling, the carrier liquid for the resin does not encounter significant barriers and is allowed to flow through the packed resin and out of the cell pairs through the periphery of the stack.

As the slurry composition can be varied during the filling cycle, the resin composition or bead size can be tailored as a function of the radial position of the resin in the cells. This allows, for example, a gradient of resin composition or bead size across the cells.

The present design also allows a more desirable closure mechanism in which the cell pairs are compressed between end plates which can be held together either by a central rod or by tie-bars, clamps or the like positioned about the periphery of the end plates. As the modules are relatively disk-shaped, it follows that the end plates will have this configuration as well. The end plates can also be combined with a dome shape which will result in uniform, axisymmetrical stresses. The disk-shaped modules also allow the use of a cylindrical shell or pipe as a pressure housing.

Finally, the present system further simplifies the fabrication process, as an injection mold of a disk-shaped or a polygonally-shaped module is simpler to design than that of a module having a rectangular configuration. In particular, the flow of molten plastic used to form the module can be either radially inward or outward with no tight corners to fill.

Thus, it is one object of the present invention to provide an electrodeionization apparatus having relatively disk-shaped diluting and concentrating compartments.

It is a further object of the present invention to provide an electrodeionization apparatus in which process stream flow paths are in a radial or spiral direction.

It is still another object of the present invention to provide an electrodeionization apparatus which can be assembled using automation techniques.

It is still a further object of the present invention to provide an electrodeionization apparatus having resin filled compartments in which the resin composition is non-uniform across the compartment.

It is still a further object of the present invention to provide an electrodeionization apparatus which maximizes the available ion exchange area of the ion exchange membranes.

It is still a further object of the present invention to provide an electrodeionization apparatus that reduces or eliminates the likelihood of leaking between concentrating and diluting compartments.

It is yet another object of the present invention to provide an electrodeionization apparatus having ion exchange compartments formed by injection molding.

It is still another object of the present invention to provide an electrodeionization apparatus having compartments that can be filled with ion exchange resins after assembly of the compartment stack.

These and other objects and features of the present invention are more fully described in the accompanying figures and detailed description of the invention.

DETAILED DESCRIPTION OF THE INVENTION

In the electrodeionization apparatus of the prior art, the apparatus includes an anode, a cathode and their compartments, a series of concentrating compartments and a series of depleting compartments.

Figure 1:
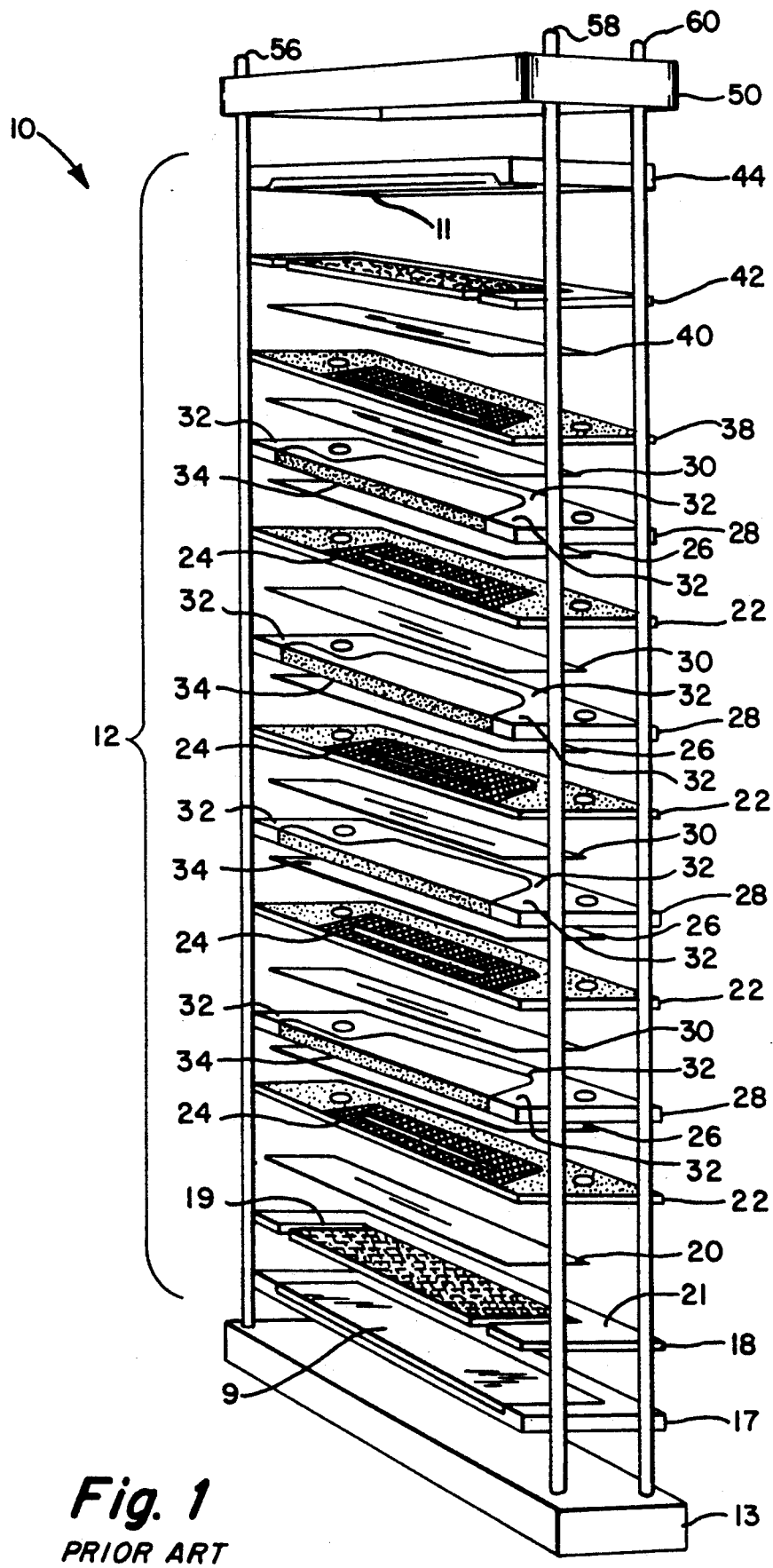
FIG. 1 is an exploded view of a conventional electrodeionization apparatus.

Referring to FIG. 1, one electrodeionization apparatus of the prior art 10 comprises one stage 12 bounded by electrode 9 and electrode 11. Adjacent to an end plate 13 is an end block 17 to house electrode 9 and desired manifolding. An electrode spacer 18 is positioned adjacent to the end block 17 and includes a screen 19 which effects turbulent flow of liquid passing through the electrode spacer 18. An ion permeable membrane 20 is sealed to the periphery 21 of electrode spacer 18. Spacers 22 formed of flexible material include a screen 24. The spacers and screen 24 comprise the concentrating compartments of the electrodeionization apparatus.

The depleting compartment structures comprise an ion permeable membrane 26, a spacer formed of rigid material 28 and ion permeable membrane 30. The ion permeable membranes 26 and 30 are sealed to the periphery 32 of the spacer 28 on opposite surfaces of the spacer 28. Ion exchange resin beads 34 are housed within a central space which includes ribs (not shown) and are retained therein by membranes 26 and 30. Liquid to be purified within a stage 12 is passed through at least one unit comprising spacers 22 and 28 and membranes 26 and 30. The units which comprise spacers 22 and 28 and membranes 26 and 30 are repeated usually between 5 and 250 times in order to provide a reasonable liquid flow-through capacity in the stage 12. A spacer 38 formed of flexible material and screen 24 plus an ion exchange membrane 40 form the end concentrate compartment. An electrode spacer 42 is positioned adjacent the end block 44 housing electrode 11. End plate 50 is positioned adjacent to the end block electrode assembly on the side opposite that adjacent to the electrode spacer 42. Bolts 56, 58 and 60 as well as a fourth bolt (not shown) extend along the entire length of the apparatus 10 to retain the apparatus elements in place.

Figure 2:
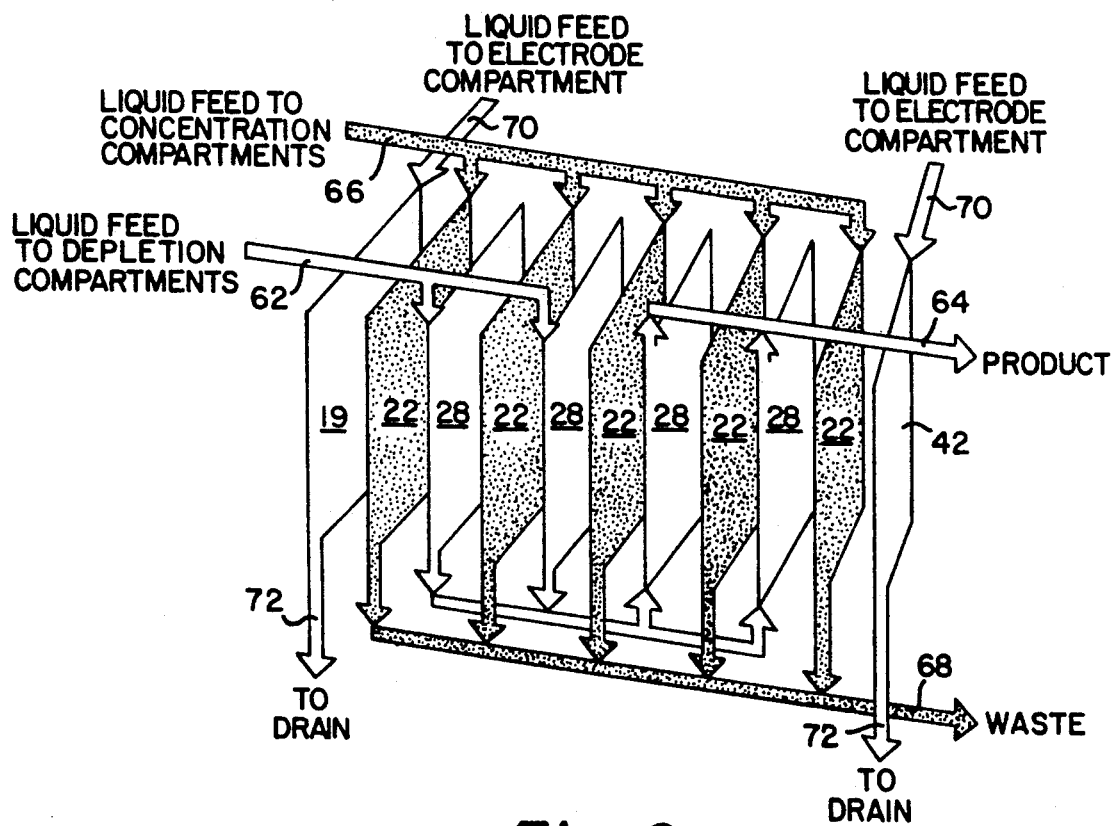
FIG. 2 is a schematic representation of the process stream flow paths through an electrodeionization apparatus.

Referring to FIG. 2, the flow paths of the liquid through the various compartments of an electrodeionization apparatus are explained. Shown is a two-stage device, although single or multiple devices can be used as well. Liquid to be purified enters inlet 62, passes through a first depleting compartment 28, and is then passed through a second depleting compartment 28. The liquid is recovered from a product stream outlet 64. Concentrating liquid is passed through inlet 66 through concentrating compartments 22 and then through a waste stream outlet 68 to a drain. Liquid electrolyte is circulated through electrode compartments 19 and 42 from inlet 70 and is discarded to drain through outlets 72.

Figure 3:
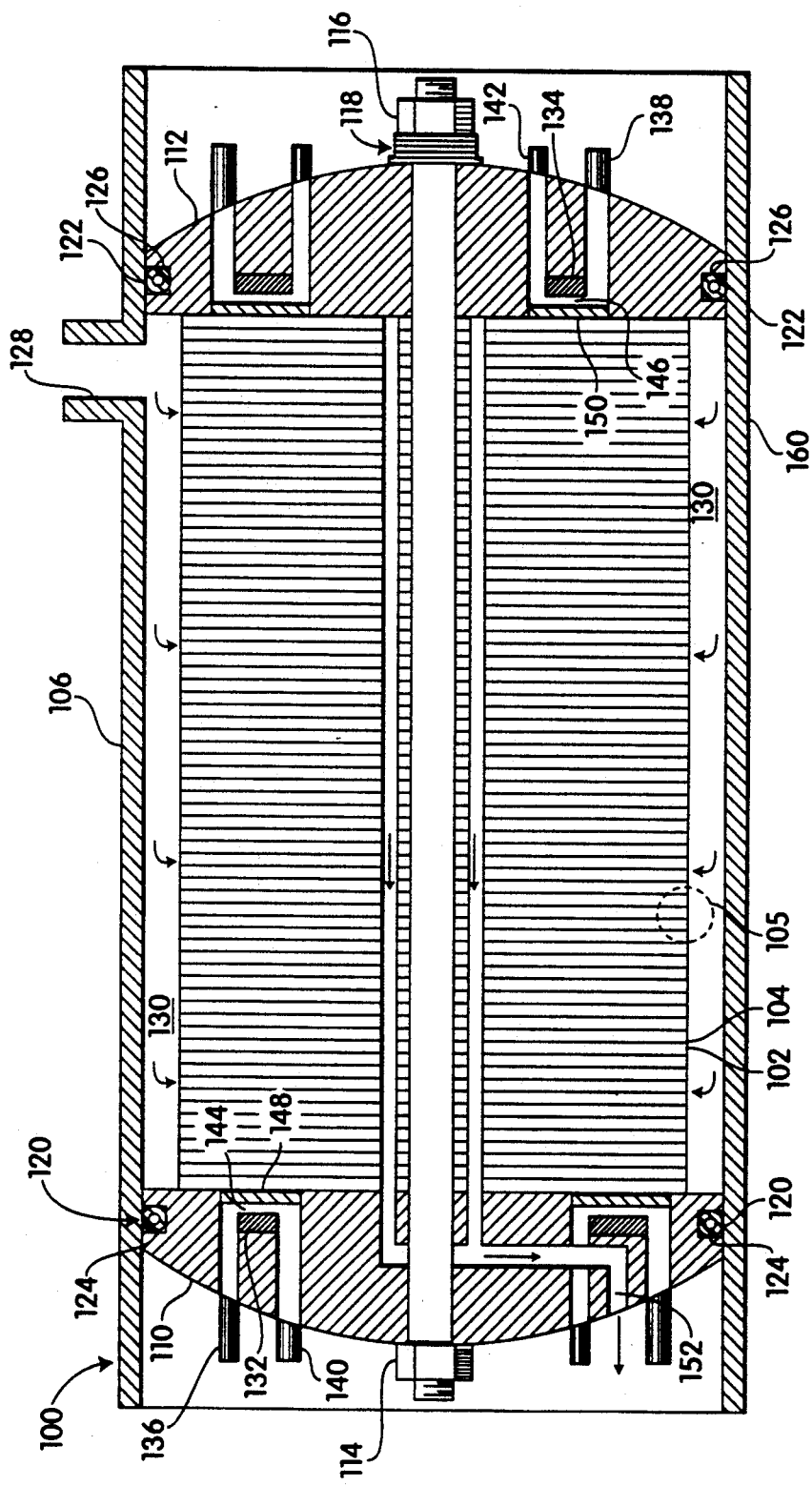
FIG. 3 is a schematic representation of one embodiment of an electrodeionization apparatus of the present invention.

One embodiment of an electrodeionization apparatus of the present invention is described in FIG. 3. In FIG. 3 the electrodeionization apparatus 100 comprises an alternating series of diluting compartments 102 and concentrating compartments 104 housed within a pressure vessel 106. Each of the compartments 102, 104 is fabricated to have a relatively disk-shaped configuration such as, preferably, a circle or a hexagonal polygon. The compartments 102, 104 are stacked in an alternating manner, to form cell pairs, about a central tie rod 108 with the compartments separated by alternating anion and cation exchange membranes. Thus, for example, in a random central portion 105 of the compartment stack, the compartment/membrane sequence can be a repeating sequence as follows: concentrating spacer, cation exchange membrane, diluting spacer, anion exchange membrane. The cation and anion exchange membranes may be affixed to either one or both of the diluting and concentrating spacers, however, a configuration in which the membranes are affixed to the spacer constituting the diluting compartment is preferred.

If the apparatus is to be operated in a polarity reversal mode, such as is described in detail in U.S. Pat. No. 4,956,071, to Giuffrida et al., the teachings of which are hereby incorporated by reference, the diluting and concentrating compartments are identical, as are the diluting and concentrating spacers. In such a case, the compartments may be referred to as "dual compartments" each formed of an odd number of ion permeable membranes. The ion permeable membranes are arranged so that an anion permeable membrane and a cation permeable membrane alternate along the axial thickness of the dual compartment stack.

In both the conventional and polarity reversal systems, at each end of the alternating compartment stack are end plates 110, 112 which are maintained at the ends of the tie rod 108 by, for example, threaded nuts 114, 116. At either or both ends of the assembly, spring washers 118 can be positioned between at least one nut and the adjacent end plate to provide resilient compression to the assembly. The end plates 110, 112 have a cross-section corresponding generally to the interior of the pressure vessel 106. O-rings 120, 122 can be positioned within channels 124, 126 formed in the end caps 110, 112 respectively to effectively seal each of the end caps within the pressure vessel. Alternatively, the means for sealing the device can be designed to be compatible with standard pressure vessel end caps, such as those used in reverse osmosis systems.

An inlet port 128 is positioned on the pressure vessel 106 at some point between the end caps 110, 112. Alternatively, the inlet port 128 can be positioned at one of the end caps itself. The inlet port 128 provides communication between the exterior of the apparatus and a feed chamber 130 which comprises a space defined as the region between the outer diameter of the concentrating/diluting compartment stack and the interior of the pressure vessel 106.

In use, a process stream is flowed through the inlet port 128 and into the process stream chamber 130. From the process stream chamber, the process stream flows into the diluting and concentrating compartments in a radial direction from the outer periphery of each diluting and concentrating compartment toward their respective centers. Since the diluting and concentrating compartments are stacked in an alternating relationship, segments of the process streams which are forced against the outer periphery of the diluting compartment enter the diluting compartment and become the diluting stream, whereas process stream segments which are forced against the outer periphery of the concentrating compartment enter the concentrating compartment to become the concentrating stream.

As in conventional electrodeionization apparatus, one surface of the diluting compartment is defined by an anion permeable membrane, whereas the opposite surface of the diluting compartment is defined by a cation permeable membrane. For specialized applications, as referenced in the pending U.S. application Ser. No.

07/628,338 incorporated previously, neutral membranes may be substituted for the anion or cation membrane. Electrodes 132, 134 contained within the end caps 110, 112 respectively and connected to an external power source (not shown), provide an electrical current across the membrane stack. The electrodes 132, 134 are preferably annular and are contained within an annular recess on the inward facing portion of each end cap. Electrode inlets 136, 138 and electrode outlets 140, 142 for each electrode provide a stream to supply liquid to electrode compartments 144, 146 which provide fluid communication between the electrodes and the compartment stack. An electrode screen 148, 150 may be included within each electrode compartment to provide turbulent flow of the liquid stream within each electrode compartment. The membrane immediately adjacent to either electrode may be either a cation, an anion or a neutral membrane, depending upon whether the electrolyte solution is to be diluted, concentrated or maintained at a constant concentration.

The electrodes provide a driving force which causes cations contained in the diluting stream to be driven through the cation permeable membrane into the concentrating stream adjacent to the cation permeable membrane. Similarly the electrodes drive anions in the diluting stream through the anion permeable membrane into the concentrating compartment adjacent to the anion permeable membrane. Thus, as the diluting stream is flowed inward toward the center of each diluting compartment it is stripped of ions and thereby purified. In contrast, the concentrating stream undergoes ion enhancement.

Both the diluting compartments 102 and the concentrating compartments 104 include means for defining a product stream outlet 152 and a waste stream outlet (not shown in FIG. 3), respectively. The product stream outlet 152 is in fluid communication with each of the diluting compartments 102 and is configured in a manner that it is allowed to pass through each of the concentrating compartments 104 without communicating therewith. Similarly, the waste stream outlet is in communication with each of the concentrating compartments 104 and is allowed to flow through the diluting compartments 102 without communicating therewith.

Figure 4:
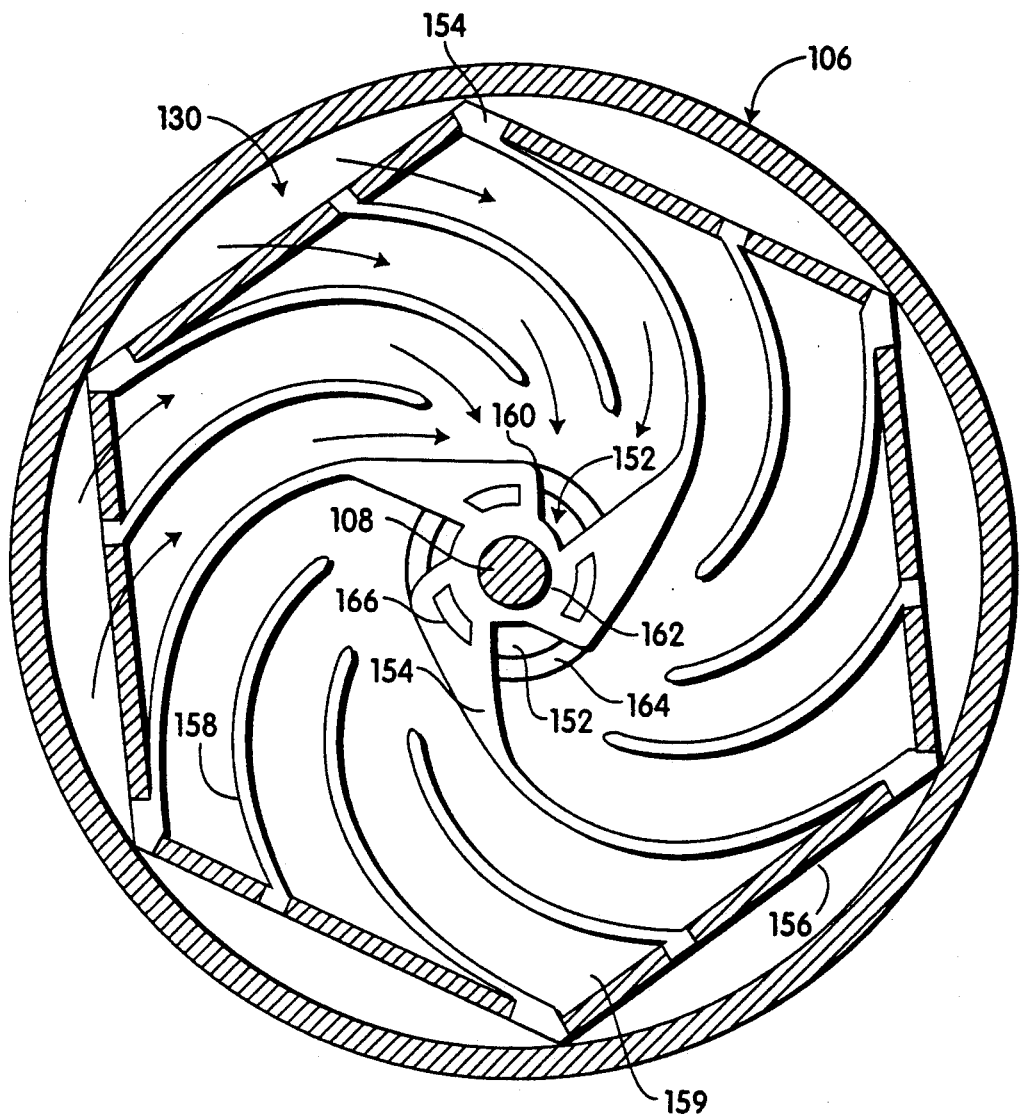
FIG. 4 is a schematic representation of one embodiment of an electrodeionization cell spacer of the present invention.

One embodiment of a representative spacer for use in a diluting or concentrating compartment is shown in FIG. 4. The compartment is defined generally by a spacer 154 formed of a relatively inert thermoplastic polymer such as, for example, a polyolefin or fluorinated hydrocarbon polymer. The spacer depicted in FIG. 4 is constructed to have a hexagonal shape, however as noted previously, it is not intended to be so limited. The outer periphery of the spacer includes a plurality of slotted compartment inlets 156 which allow the process stream to flow from the feed chamber 130 into the compartment. A plurality of curved baffles 158 define relatively curved flow paths 159 between the compartment inlet and the center of the spacer. Each spacer 154 includes a central hub 160 surrounding an axial aperture 162 for containing the tie rod 108. In the case of a diluting compartment, the hub 160 includes outlet ports 164 for allowing the dilute fluid stream flowing through the compartment to enter a product fluid outlet 152 as well as a transit channel 166 which allows the concentrate fluid stream to pass through the compartment without communicating therewith.

Likewise, in the case in which the spacer 154 defines a concentrating compartment, the outlet ports 164 allow the concentrate stream to flow into the waste fluid outlet while the transit channels 166 define a product stream flow path through the concentrating compartment while isolating the product stream therefrom.

It is noted that, since in an electrodeionization apparatus at least the diluting compartments are filled with an ion exchange resin, the space between the baffles 158 of the spacer 154 would contain ion exchange resins. In addition, ion exchange membranes would be positioned both above and below the spacer as shown. Thus, if for example, an anode was positioned above the page and a cathode was positioned below the page relative to the compartment of FIG. 4 (in the case of a diluting compartment) the top surface of the spacer would be in contact with an anion permeable membrane and the bottom surface of the spacer would be in contact with a cation permeable membrane.

If, as noted previously, the spacer of FIG. 4 is intended to define a diluting compartment 102, spacers defining concentrating compartments 104 would be positioned on either side of the spacer of FIG. 4. Each of the concentrating compartment spacers may be formed to be identical to the diluting compartment spacer. During stack assembly the adjacent spacers would be rotated approximately 60° about the tie rod 108 relative to the adjacent spacer to thereby allow the transit channels of every other spacer to be in communication with the compartments adjacent to each spacer. The result is a cell stack in which each compartment is isolated from the adjacent compartments, but in fluid communication with the compartments positioned an even number of spaces away.

In the case of a concentrating compartment, the space between the baffles need not be filled with an ion exchange resin, however, for reasons to be described shortly, it may be desirable to provide a resin filled concentrating compartment.

The present design offers several advantages over electrodeionization apparatus using the rectangular compartments of the prior art. For example, the circular or hexagonal cell design creates a radial inward flow path of the diluting and concentrating streams. This radial inward flow results in excellent flow distribution. Furthermore, the linear velocity, and therefore mass transfer rate, is caused to increase as the diluting and concentrating streams flow toward their respective outlets in the central hub of each compartment.

Additionally, unlike conventional electrodeionization apparatus, sealing between the diluting and concentrating chambers is necessary only around the outlets in the center of the cell pairs. Since the periphery of each compartment spacer defines flow inlets, (from the uniform process stream), the need to seal each compartment about its edges, as in the case in conventional electrodeionization apparatus, is eliminated. This offers a two-fold advantage. First, it greatly simplifies the assembly process as it is no longer necessary to provide extensive sealing between each of the compartments. Second, since sealing is minimized, (necessary only about the center of the spacer), the loss of membrane surface area resulting from membrane-to-spacer seals is eliminated. Since only unsealed ion exchange membrane can be used for ion exchange, the minimization of membrane sealing provides more effective exchange area per membrane unit area. This translates directly as an increased membrane efficiency per membrane unit area used in the construction of the device.

Furthermore, the present design is better suited for use in a pressure vessel. This results in the virtual elimination of external leaks, a simpler and more effective closing mechanism via the single tie rod and the ability to provide a unit having a cartridge of stacked diluting and concentrating compartments that can be easily removed for reconditioning or replacement if necessary.

As noted previously, the diluting compartment and, optionally, the concentrating compartment are filled with ion exchange resins. These resins can be placed within their respective compartments either prior to assembling the compartment stack or, preferably, subsequent to the assembly of the compartment stack. Resin filling is accomplished by pumping a suspension of resins, in the form of a slurry, into the stack through the product stream outlet and, in the case in which it is desired to fill the concentrating compartment, through the waste stream outlet. During resin filling, the stacked compartments are rotated about their central axis. The rotational force distributes the slurry in the compartments to be filled. The slotted periphery (i.e., the compartment inlets) retains the resins while allowing the carrier liquid to flow through the packed resins and out of the stack. Once the cell pairs have been filled, porous slats are inserted into the filling ports in the center to contain the resin within the compartments. The slats preferably are slotted to minimize plugging of passages with fine resins.

The filling technique described above allows the composition of the slurry to be varied during the filling cycle. As such, the resin composition can be tailored as a function of the radial position of the resin within the cells.

The size and design of the spacers, and particularly the diluting spacer, must be optimized. For an electrodeionization polishing application, where a flow path of only about 4 inches is required, a disk or polygon with purely radial flow and a diameter of approximately 9-10 inches may be used. In applications in which an increased path length is desired, the curved baffles of FIG. 4 can be used to increase the path length to 13 inches or greater.

As noted previously, the concentrating compartment can include an ion exchange resin. Alternatively, it can be filled simply with an inert or ionically conductive screen or mesh to provide turbulent flow through the compartment. As also discussed previously, sealing between the diluting and concentrating compartments in necessary only about the outlets near the center of the cell pairs. Sealing can be effected through adhesives, solvent bonding, heat, ultrasonic welding, inductive welding and other methods of bonding polymeric materials.

The present design yields membrane utilization which is much higher than the rectangular cell pairs of the prior art. Circular membranes for the disk-shaped cell pairs can be cut from a membrane sheet with center of each circle arranged in a hexagonal pattern (hexagonal close packing), which results in a membrane waste of only approximately 10%. In the case of a hexagonal, square or rectangular compartment design, ion exchange membranes can be cut into a plurality of hexagonal, square or rectangular shapes, respectively, with virtually no waste of membrane material. Additional losses of effective membrane area occur only in the area of the central hub of the spacer as well as in the area beneath any baffles.

As noted above, the spacers used for the diluting compartment and the concentrating compartment can be identical, however they need not be. For example, depending upon the application, the thickness of the diluting and concentrating compartments, relative to each other, can vary. For example, in applications in which it is desirable to operate the apparatus in a polarity reversal mode, the dilute and concentrate spacers can have an identical shape and thickness. In the case of non-reversal applications, however, the spacer used to define the concentrating compartment can be thinner than the spacer used to define the diluting compartment to insure adequate flow velocity under high recovery conditions.

In the case in which the concentrating compartments are filled with ion exchange resin, higher mass transfer rates, better product quality and lower electrical resistance per cell pair can be achieved.

In addition, the use of concentrating compartments containing an ion exchange resin allows the apparatus to be run in the polarity reversal mode. In this mode, the polarity of the electrodes can be reversed such that electrodes that comprise anodes are changed to cathodes, and electrodes that comprise cathodes are changed to anodes. When such a reversal occurs, the depleting compartments become concentrating compartments and the concentrating compartments become depleting compartments. As the compartments are switched, the product outlets become waste stream outlets and the waste stream outlets become product outlets. Operation of the apparatus in polarity reversal mode provides a system in which the build up of particulates, organics and scale within the apparatus can be avoided. A more detailed discussion of polarity reversal operation is described in U.S. Pat. No. 4,956,071 to Giuffrida et al., the teachings of which are incorporated herein by reference.

Operation of the electrodeionization apparatus in polarity reversal mode is advantageous in that it provides an apparatus that is well adapted for domestic applications such as home water softeners. One such apparatus is depicted schematically in FIG. 5.

Figure 5:
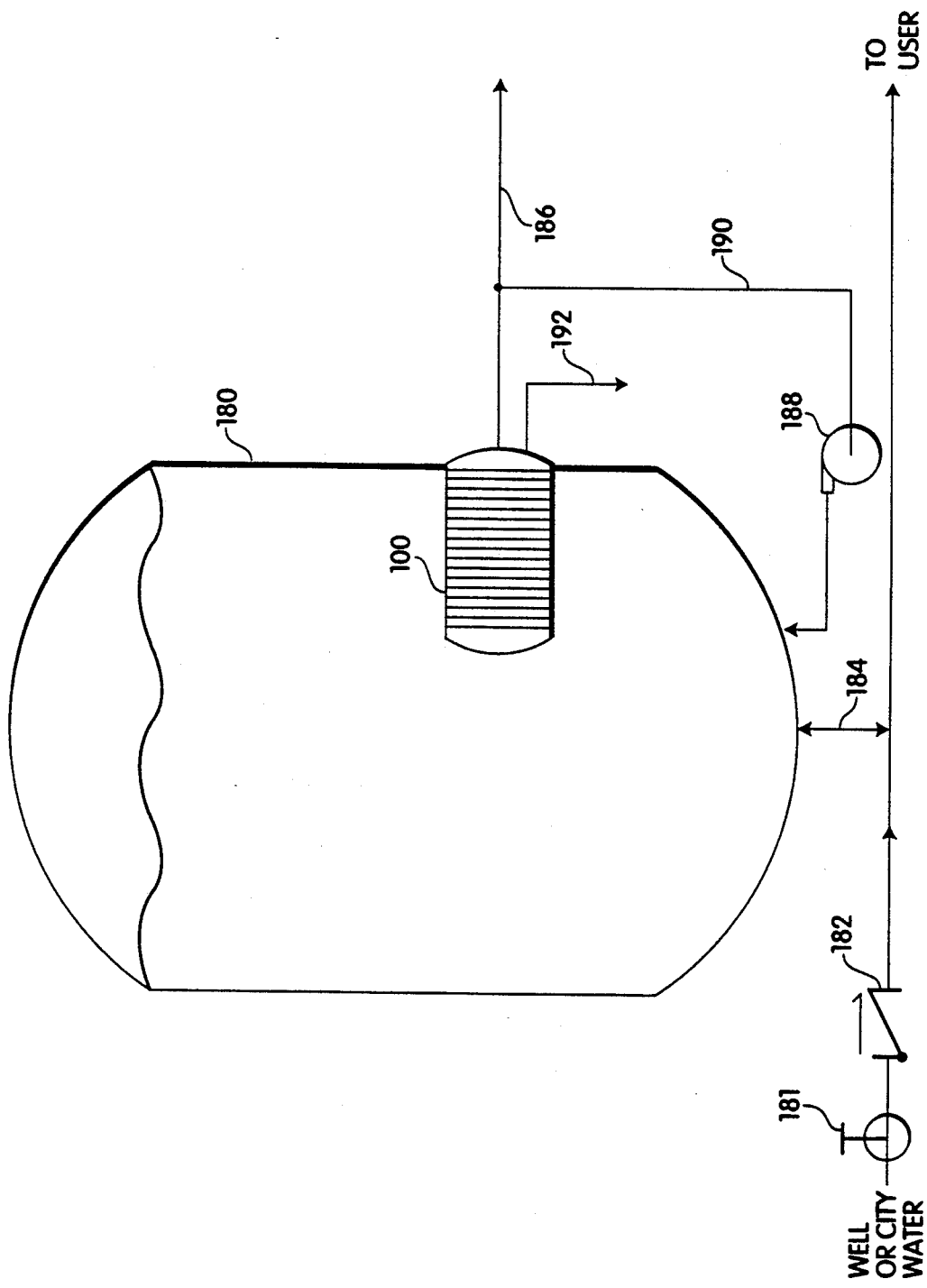
FIG. 5 is a schematic representation of one embodiment of the apparatus depicted in FIG. 4.

In FIG. 5, an electrodeionization apparatus 100 such as that depicted in FIG. 3 is incorporated into one wall of a surge tank 180, thereby eliminating the need for a pressure vessel. Water from a source such as a well or a city water supply is flowed through a solenoid- or motor-operated valve 181 and a check valve 182 and into an inlet/outlet pipe 184 for the surge tank. In one pass applications, internal pressure in the surge tank 180 forces feed water through the electrodeionization apparatus 100 causing the water to be purified. The purified water can then be flowed to a subsequent treatment stage or to the user through product pipe 186.

Alternatively, in recirculation applications, effluent from the electrodeionization stack is recirculated back to the surge tank 180 via a recirculation pump 188. The use of the surge tank allows peak flow demands to be met while allowing a relatively small electrodeionization unit to operate continuously to desalinate or purify the contents of the tank. By allowing for a small electrodeionization unit, the overall cost of the system can thereby be reduced.

In use, the dilute stream exiting from the electrodeionization apparatus 100 is supplied to the recirculation pump 188 via a recirculation line 190. The product water ultimately may be drawn from the tank 180 via the inlet/outlet pipe 184. Alternatively, valving can be added to the system to provide the user with the option of drawing product water from the recirculation stream through the product pipe 186 as in a one-pass application. A waste pipe 192 allows the concentrated waste stream to exit from the surge tank and be passed to a drain.

In addition, the system depicted in FIG. 5 allows surplus water to be flowed directly to the user by completely bypassing the surge tank and the electrodeionization apparatus if very high volume applications are required or if water is needed in applications in which electrodeionization is unnecessary.

The solenoid- or motor-operated valve 181 is closed when deionized water is provided to the user from the surge tank 180 via the inlet/outlet pipe 184. Alternatively, when it is desired to bypass the surge tank and electrodeionization unit and use water directly from the source, valve 181 is opened.

Figure 6:
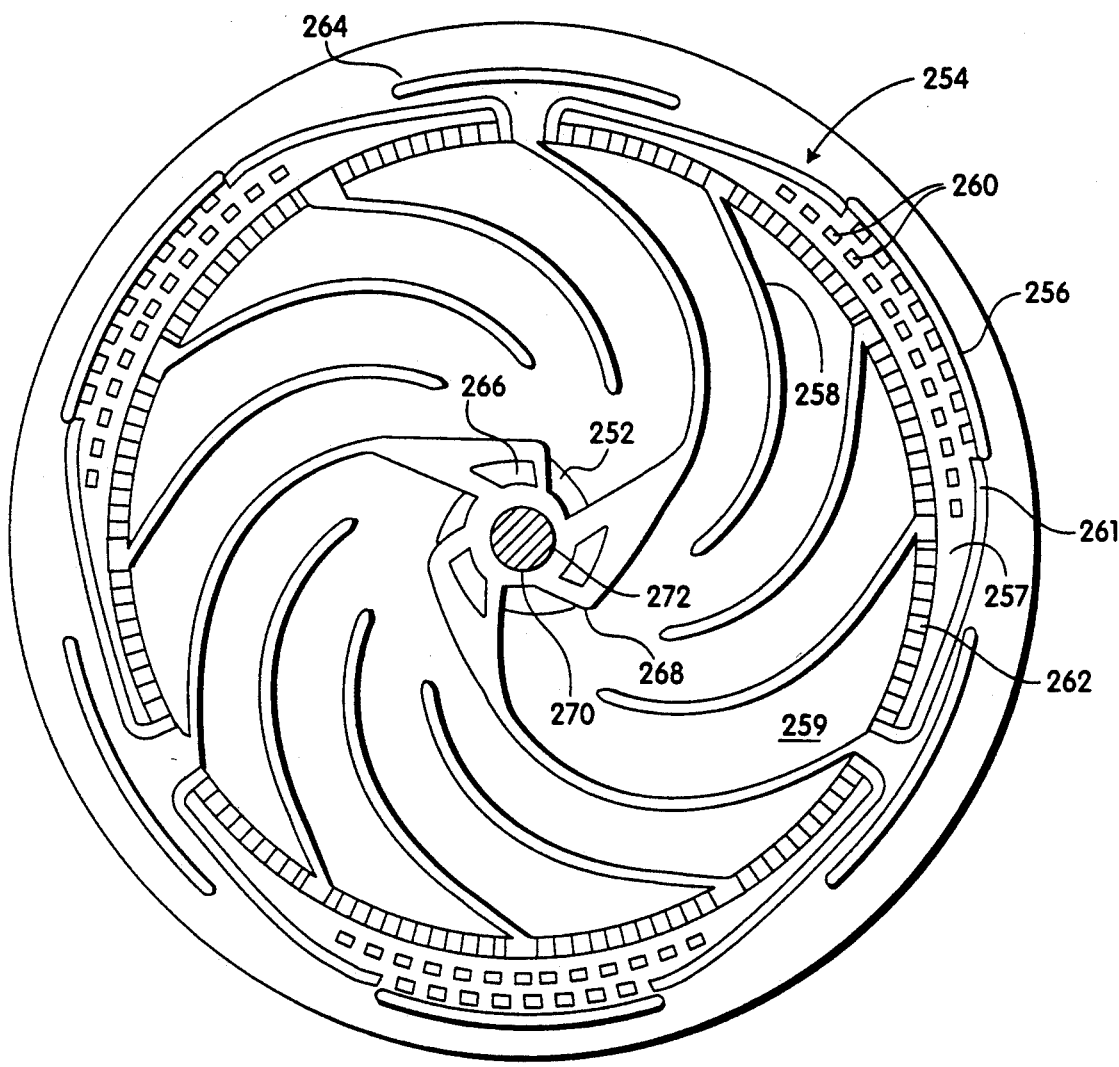
FIG. 6 is a schematic representation of a second embodiment of an electrodeionization cell spacer of the present invention.

Another embodiment of the present invention is depicted in FIG. 6. FIG. 6 shows a spacer 254 that is adapted to separate the process stream into diluting streams and concentrating streams prior to entry of the streams into the respective diluting and concentrating compartments. As will be described shortly, spacers 254 of the type depicted in FIG. 6, exhibit a decreased useful membrane surface area, relative to those of the embodiment of FIG. 4, yet they allow for the elimination of an external pressure vessel and provide a system that may be adapted for a two-pass flow path through the module, thereby enhancing overall process efficiency.

The spacer 254 depicted in FIG. 6 can be used for either a concentrating compartment or for a diluting compartment. For simplicity of description, however, the spacer of FIG. 6 will be described in the diluting compartment application.

The spacer 254 is formed of a relatively inert thermoplastic polymer such as polypropylene. The spacer is designed to have a relatively circular shape including a plurality of curved baffles 258 which define flow paths 259 through the compartment. The diluting stream is fed into the diluting compartment via diluting stream inlets 256 which are isolated from the exterior circumference of the cell. The inlets are in communication with a diluting stream prechamber 257 defined by a prechamber wall 261. The diluting prechamber 257 further includes a plurality of mixing barriers 260 which serve to mix the diluting stream through the prechamber and prevent stagnant zones or areas of non-uniform pressure. The chamber further includes a plurality of inlet slots 262 which further mix the diluting stream as it enters the individual flow paths 259.

During operation, a diluting process stream enters the module and travels through the diluting stream inlets 256 in a direction perpendicular to that of FIG. 6. Upon encountering the diluting compartment, a portion of the stream enters the prechamber 257 from the diluting stream inlet 256. This stream then passes through the inlet slots 262 and into the flow-paths 259 where it undergoes an electrodeionization process which transfers contaminant components into the adjacent concentrating compartments. As in the case of the spacer depicted in FIG. 4, the diluting stream exits the chamber through a product stream outlet 252. Simultaneously, a concentrating stream is flowed through a concentrating inlet 264 and a concentrating transit channel 266 containing the enhanced concentrating stream in a manner such that communication between the concentrating stream and the diluting stream is avoided. The diluting stream outlet 252 and the concentrating stream transit channel 266 are defined by channels contained within a hub 268 having an axial aperture 270 for containing a tie rod 272 for maintaining the spacers in the stack configuration in the manner described previously.

It should be noted that, whereas in the embodiment described previously, although the concentrating and diluting outlet streams were isolated from each other, the process stream inlets for the concentrating compartments and the diluting compartments shared a common feed source. In contrast, in the embodiment of FIG. 6, the diluting stream inlet (or in the case of a spacer comprising a concentrating chamber, the concentrating stream inlet) are physically separated from one another. Thus, rather than having a feed stream split into diluting and concentrating components at the periphery of the spacer, the spacer depicted in FIG. 6 requires that the process stream be separated into diluting and concentrating components at some point upstream of the compartment stack. This allows for concentrate recirculation for both standard and polarity reversal devices, which has the advantage of allowing high concentrate stream velocities while maintaining high water recoveries.

As a result of this earlier separation, the spacers must be sealed about their periphery. The ion exchange membranes positioned adjacent the upper and lower surfaces of the membrane stack also become sealed along their outer edges, thereby decreasing overall membrane efficiency as a result of reduced, unsealed membrane area. However, although some membrane surface area is lost, the membrane efficiency is still greater than that of conventional electrodeionization apparatus. Further, the design offers the possibility of a two-pass flow path through the electrodeionization module. Such a configuration is depicted in FIG. 7

Figure 7:
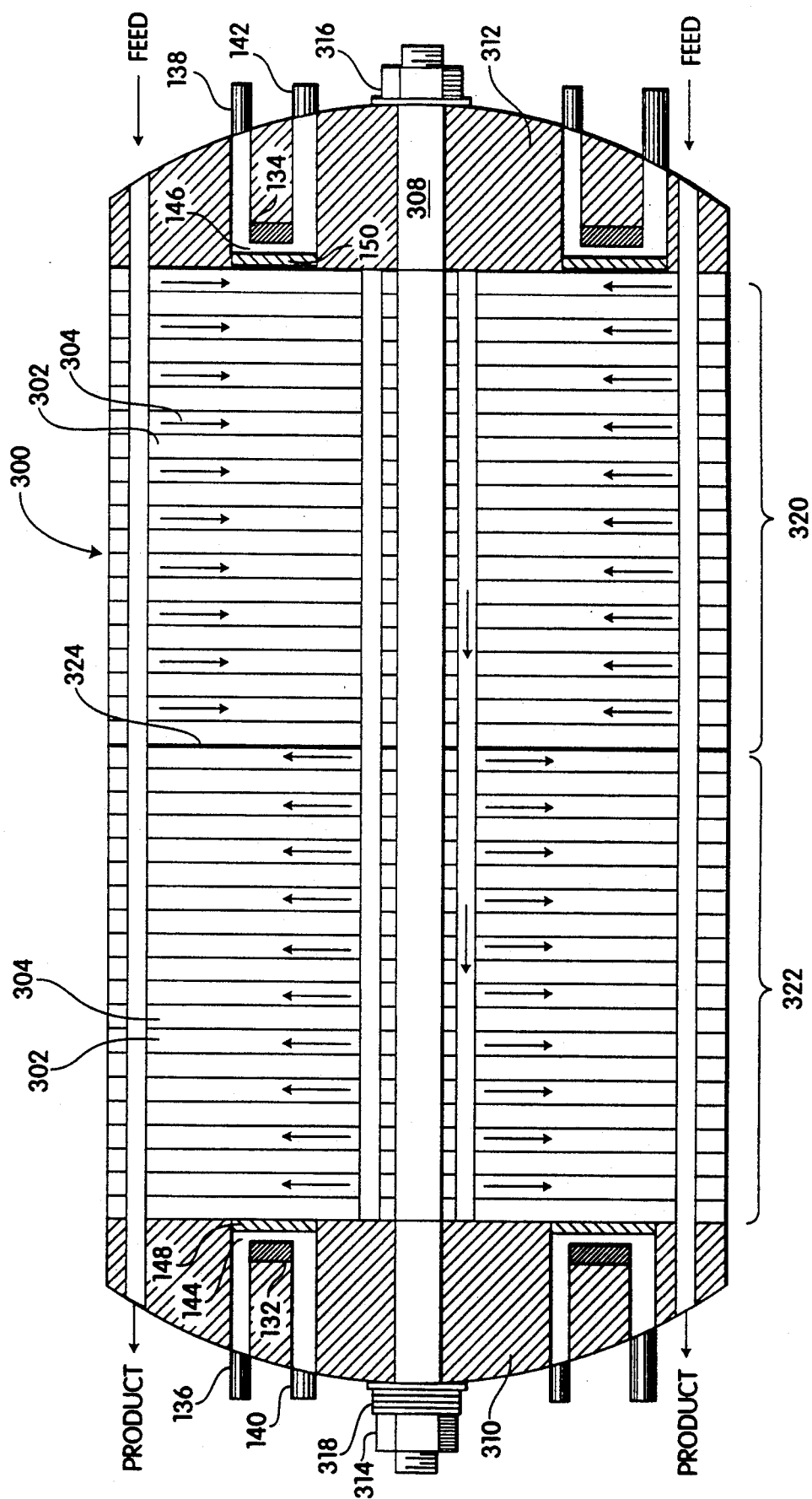
FIG. 7 is a schematic representation of a second embodiment of an electrodeionization apparatus of the present invention.

FIG. 7 depicts an electrodeionization apparatus 300 provided with a two-pass flow path through the stack of concentrating 304 and diluting 302 compartments to provide a system with enhanced removal capability. Such a design is advantageous in that a two-pass flow of the dilute stream will result in either higher product quality for a given size module or a reduction in the size of the module needed to achieve a given quality. Thus, such a design allows modules having small cartridge shapes to achieve the same removal.

Similarly, two-pass flow of the concentrating stream will allow high recovery of ions in the concentrating compartments while maintaining the necessary flow velocity in the concentrating compartments without using a concentrate recirculation pump. As will be pointed out shortly, such a design also eliminates the need to use a pressure vessel to contain the stack of concentrating and diluting compartments. Although such a design will result in a lower membrane utilization (approximately 65%) than that for the previously mentioned single-pass assembly, membrane utilization will still be higher than that which can be achieved using conventional electrodeionization apparatus. As depicted in FIG. 7, the electrodeionization apparatus 300 comprises alternating diluting compartments 302 and concentrating compartments 304 which are stacked together and maintained about a central tie rod 308 by means of end caps 310, 312. As in the previous example, nuts 314, 316 are used in connection with spring washers 318 to seal off the ends of the compartment stack. The electrodes 132 and 134 are as described previously.

Two-pass operation of an electrodeionization module can be achieved by selectively blocking flow through the feed inlet at some point within the electrodeionization stack. In the example shown in FIG. 7, in the first half 320 of the stack, the dilute stream flows through the diluting compartments from the perimeter inwards toward the center, and in the second half 322 of the stack, the dilute stream flows from the center out towards the perimeter, thereby doubling the effective flow path through the module. The flow may be easily blocked by providing a separating spacer 324 that does not include flow inlets and by positioning that spacer at a dividing line between the two halves 320, 322 of the electrodeionization stack.

Unlike FIG. 4, where only the outlet requires sealing, sealing between the diluting and concentrating streams is necessary both at the outlet ports in the center of the cell pairs and at the inlet slots positioned about the periphery of each cell. After the cell pairs have been assembled into a stack, the outer periphery of the diluting and concentrating spacers can be sealed by fusion welding or other methods as described below. As in the previous examples, if both the concentrating compartments and the diluting compartments are filled with an ion exchange resin, the apparatus can be adapted for use in a polarity reversal mode.

One method for manufacturing the aforementioned electrodeionization stacks is as follows. In the case of the first embodiment described above, unconditioned and dry cation and anion exchange membranes are bonded to the dilute spacer about the outlet ports at the center hub so that the dilute and concentrate outlet ports are isolated from each other. Bonding can be achieved with adhesives, solvents, ultrasonic welding, fusion welding or any other suitable method. The cell pairs are assembled with one concentrate spacer on top of each dilute spacer with bonded membranes. The cell pairs are bonded to each other only around the outlet ports by ultrasonic welding or other methods. Once assembled, the stack of cell pairs is immersed into a membrane conditioning tank to condition the membranes as is well-known in the art.

It is noted that during the module assembly process, the module should not be fully tightened prior to membrane conditioning as this may lead to the formation of wrinkles in the membrane. Thus, it is preferred that the module be conditioned while in a loose state, since during conditioning the membrane may expand. After the membrane is conditioned, the module may then be fully tightened.

Following the membrane conditioning and module tightening process, the stack is installed in a device which rotates the stack about its central axis while introducing a dilute slurry of ion exchange resins into the dilute compartments through the outlet ports in the central hub. The slurry can be dispensed with tubes which traverse back and forth down the outlet manifolds, thereby assuring uniform flow of resins into the individual compartments.

The ratio between the anion resin and the cation resin in a slurry can be varied continuously by metering the resins separately into the carrier fluid thereby allowing a composition gradient of the resins within the compartment. The centrifugal force provided by the rotation of the stack evenly distributes the slurry into the compartments. The resins are retained by the slotted periphery of the spacers with the carrier liquid of the slurry flowing through the packed resin and out of the cell pairs through the periphery of the cell pair stack. Once the cell pairs have been filled, porous slats can be inserted into the filling ports in the center to contain the resins. The slats are preferably slotted to minimize plugging of passages by fine components of the resin Additionally, the slats can be designed to be removable, thereby allowing resin replacement by fluidization and backwashing if the resins become fouled, plugged or damaged during use.

Following assembly and filling of the cell stack, the end plates containing the electrodes are added and the complete stack is compressed by a rod through the center of the stack. As noted previously, the ends of the rod are threaded and spring washers can be added between the nuts at the end of the rod to maintain compressive force on the stack. The completed module may then be inserted into a pressure vessel for use.

In the case of a polarity reversal cell, the manufacturing process is identical to that described above except that the concentrating compartments are also filled with ion exchange resins using the same method. Unlike the design of the non-polarity reversal stack in which the concentrating compartments can be thinner than the diluting compartments, in the case of polarity reversal applications, the concentrating spacers are designed to be the same thickness as those used in the diluting compartments.

If spacers of the type depicted in FIG. 6 are to be used, the assembly process is as follows.

Unconditioned and dry cation and anion exchange membrane are bonded to the dilute spacer around the ports in the center so that the diluting and concentrating outlet ports are isolated from one another. As before, bonding can be achieved with adhesives, solvents, ultrasonic welding, fusion welding or any other suitable method. The cell pairs are assembled with one concentrate spacer on top of each dilute spacer with bonded membranes. Again, as before, the cell pairs are bonded to each other around the ports in the center by ultrasonic welding or other methods. The membranes are conditioned by immersion into a membrane conditioning tank as before. Once the membranes have been conditioned, the cell pairs are bonded to each other around the ports in the periphery by ultrasonic welding or other methods. As an alternative, the membranes can be prebonded one-half cell at a time and even preconditioned prior to bonding. This would allow the stack to be built one cell at a time.

The cell pairs are filled with ion exchange resins using the method in which the cell stack is rotated and the resins are added in the form of a slurry as described above. Once the stack has been fully assembled and compressed between the end plates, the outer periphery of the dilute and concentrate spacers are fusion welded to completely seal the stack and eliminate any external leakage. In the case in which a two-pass flow stack is desired, the manufacturing process is identical to that described above except that a spacer in the middle of the stack is not provided with inlet ports to thereby block liquid flow in the ports around the periphery of the stack at the location of the separation spacer.

As noted above, it is possible to build and bond the cells of the module one cell at a time and subsequently fill the cells with the desired resins when the assembly or sub assembly is complete.

Equivalents

Although the specific features of the invention are shown in some drawings and not in others, it is for convenience only and each feature may be combined with any or all of the other features in accordance with the invention.

It should be understood, however, that the foregoing description of the invention is intended merely to be illustrative by way of example only and that other modifications, embodiments, and equivalents may be apparent to those skilled in the art without departing from its spirit.

Various objects of the invention generally can be achieved by using an electrodeionization apparatus having diluting and concentrating compartments defined, in part, by disk-shaped spacers. It will be understood by those of ordinary skill in the art that other spacer configurations may be substituted or added consistent with this invention. As an example, the invention permits the use of a spacer having an octagonal or square cross-section as well as the circular and hexagonal embodiments detailed above.

Having thus described the invention, what we desire to claim and secure by Letters Patent is:

1. A modular cell for use in an electrodeionization apparatus, the cell comprising an electrically inert disk-shaped spacer having a central hub and upper and lower surfaces, an anion permeable membrane disposed adjacent to one of said upper and lower surfaces and a cation permeable membrane disposed adjacent to the other of said upper and lower surfaces to thereby define a first compartment between said anion permeable and said cation permeable membranes, the periphery of the disk-shaped spacer having a process stream inlet and the central hub of the spacer including at least one transit channel isolated from the first compartment, the transit channel providing fluid communication at least with a second compartment positioned immediately adjacent to and isolated from said first compartment, the hub further including a process stream outlet constructed and arranged to provide fluid communication with at least one other compartment, said other compartment isolated from said first compartment and having at least one second compartment disposed between itself and the first compartment.

2. A modular cell as in claim 1 wherein the disk-shaped spacer includes a plurality of baffles to define a process stream flow path.

3. A modular cell as in claim 2 wherein the baffles are curved.

4. A modular cell as in claim 1 wherein the first compartment is a diluting compartment.

5. A modular cell as in claim 4 wherein the compartment is filled with an ion exchange resin.

6. A modular cell as in claim 5 wherein the ion exchange resin is compositionally graded through the compartment.

7. A modular cell as in claim 4 wherein said second compartment comprises a concentrating compartment.

8. A modular cell as in claim 1 wherein said first compartment comprises a concentrating compartment.

9. A modular cell as in claim 8 wherein the concentrating compartment includes a plurality of baffles to define a flow path therethrough.

10. A modular cell as in claim 9 wherein the baffles are curved.

11. A modular cell as in claim 8 wherein said second compartment comprises a diluting compartment.

12. A modular cell as in claim 8 wherein the concentrating compartment includes an inert screen contained therein.

13. A modular cell as in claim 8 wherein the concentrating compartment includes an electrically conductive screen contained therein.

14. A modular cell as in claim 8 wherein the concentrating compartment contains an ion exchange resin.

15. A modular cell as in claim 14 wherein the ion exchange resin is compositionally graded through the compartment.

16. A modular cell as in claim 1 wherein the hub includes a central aperture constructed and arranged to accept a tie-rod.

17. A modular cell as in claim 1 wherein the hub includes three product stream outlets.

18. A modular cell as in claim 17 wherein said process stream outlets are positioned about said hub at 120° increments from each other.

19. A modular cell as in claim 1 wherein the hub further includes three transit channels.

20. A modular cell as in claim 19 wherein the transit channels are positioned about the hub at 120° increments from each other.

21. A modular cell as in claim 1 contained within a pressure vessel.

22. A modular cell as in claim 1 wherein the process stream inlet is isolated from the exterior circumference of the cell.

23. Electrodeionization apparatus comprising at least one cell pair, the cell pair comprising a first cell and a second cell, each of said first and second cells defining first and second compartments respectively, the first compartment including an electrically inert disk-shaped spacer having a central hub and a process stream inlet, wherein the hub includes at least one transit channel isolated from the first compartment, the transit channel providing fluid communication with the second cell and at least one process stream outlet isolated from the second cell, and further wherein at least one cell is disposed between an anion exchange membrane and a cation exchange membrane.

24. Electrodeionization apparatus as in claim 23 wherein each spacer further includes a plurality of baffles.

25. Electrodeionization apparatus of claim 23 wherein the cell disposed between the anion exchange membrane and the cation exchange membrane comprises a diluting compartment.

26. Electrodeionization apparatus of claim 25 wherein the cell disposed between the anion exchange membrane and the cation exchange membrane is filled with an ion exchange resin.

27. Electrodeionization apparatus as in claim 26 wherein the ion exchange resin is compositionally graded through the cell.

28. Electrodeionization apparatus of claim 25 wherein the other cell defines a concentrating compartment.

29. Electrodeionization apparatus of claim 28 wherein the compartment includes an inert screen contained therein.

30. Electrodeionization apparatus of claim 28 wherein the compartment includes an electrically conductive screen contained therein.

31. Electrodeionization apparatus of claim 28 wherein the concentrating compartment is filled with an ion exchange resin.

32. Electrodeionization apparatus of claim 23 wherein the process stream inlet of said first cell is isolated from the process stream inlet of said second cell.

33. Electrodeionization apparatus of claim 23 comprising a plurality of cell pairs.

34. Electrodeionization apparatus of claim 33 wherein the plurality of cell pairs is disposed between an anode and a cathode.

35. Electrodeionization apparatus of claim 34 wherein the plurality of cell pairs are contained within a pressure vessel.

36. Electrodeionization apparatus as in claim 35 wherein the process stream inlet of the cell pairs is located about the periphery of each cell pair.

37. Electrodeionization apparatus as in claim 36 wherein the process stream inlet of said first cell is in fluid communication with the process stream inlet of said second cell.

38. Electrodeionization apparatus as in claim 23 wherein the process stream inlet of the cell pairs is isolated from the periphery of each cell pair.

39. Electrodeionization apparatus as in claim 38 wherein the ion exchange resin is compositionally graded through the cell.

40. Electrodeionization apparatus as in claim 23 wherein the spacer of said first cell is rotated relative to the spacer of said second cell by 60°.

41. Electrodeionization apparatus as in claim 23 wherein the second compartment includes an electrically inert disk-shaped spacer having a central hub and a process stream inlet, wherein the hub includes a transit channel isolated from the second compartment, the transit channel providing fluid communication with the first cell, and at least one process stream outlet isolated from the first cell.

* * * * *